United States Patent [19]

Jacquot et al.

[11] Patent Number: 4,648,294
[45] Date of Patent: Mar. 10, 1987

[54] METHOD AND APPARATUS FOR MACHINING A GROOVE AROUND A TUBULAR MEMBER

[75] Inventors: Alain Jacquot; Jacques Charpentier, both of Tours, France

[73] Assignees: SKF Compagnie d'Applications Mechaniques, Clamart; Framatome, Courbevoie, both of France

[21] Appl. No.: 763,756

[22] Filed: Aug. 7, 1985

Related U.S. Application Data

[63] Continuation of Ser. No. 446,818, Dec. 3, 1982, abandoned.

[30] Foreign Application Priority Data

Dec. 7, 1981 [FR] France ................. 81 22870

[51] Int. Cl.⁴ .................................. B23B 5/00
[52] U.S. Cl. ........................... 82/4 R; 82/4 C
[58] Field of Search ............... 82/4 R, 4 C, 1 C

[56] References Cited

U.S. PATENT DOCUMENTS

| | | |
|---|---|---|
| 1,625,800 | 4/1927 | Edwards . |
| 1,973,597 | 9/1934 | Anderson ............... 82/4 R |
| 2,211,134 | 8/1940 | Kruell . |
| 2,451,729 | 10/1948 | Gardner . |
| 3,078,749 | 2/1963 | Maxner et al. ........... 82/4 R |
| 3,131,599 | 5/1964 | MacFarlane et al. ........ 82/4 R |
| 3,264,911 | 8/1966 | Crider ................... 82/4 R |
| 3,630,109 | 12/1971 | MacMichael et al. ........ 82/4 R |
| 3,733,939 | 5/1973 | Paysinger et al. .......... 82/4 C |
| 3,744,356 | 7/1973 | Slator et al. ............. 82/4 C |
| 3,813,968 | 6/1974 | Thomas .................. 82/4 C |
| 3,818,786 | 6/1974 | Leshem ................. 82/4 C |
| 3,916,519 | 11/1975 | Gilmore . |
| 4,050,836 | 9/1977 | Anders .................. 82/4 C |
| 4,126,065 | 11/1978 | Clavin .................. 82/4 C |
| 4,130,034 | 12/1978 | Benoit .................. 82/4 C |
| 4,185,525 | 1/1980 | Sherer .................. 82/4 C |
| 4,231,690 | 11/1980 | Burns ................... 82/4 C |
| 4,314,491 | 2/1982 | Hartmann et al. ........ 82/4 R |
| 4,343,207 | 8/1982 | Paysinger .............. 82/4 R |
| 4,362,447 | 12/1982 | Pekar ................... 82/4 C |
| 4,385,535 | 5/1983 | Tedder ................. 82/4 R |
| 4,411,178 | 10/1983 | Wachs et al. ............ 82/4 C |
| 4,418,591 | 12/1983 | Astle ................... 82/4 C |

FOREIGN PATENT DOCUMENTS

| | | |
|---|---|---|
| 2211313 | 7/1974 | France . |
| 2423298 | 11/1979 | France . |
| 1508544 | 4/1978 | United Kingdom . |

Primary Examiner—Francis S. Husar
Assistant Examiner—Jerry Kearns
Attorney, Agent, or Firm—Beveridge, DeGrandi and Weilacher

[57] ABSTRACT

Machine for machining a groove round the external periphery of the base of a nozzle and notably enabling the back of a weld to be reworked from the outside when a nozzle is being installed on a nuclear reactor vessel.

The machine comprises a cylindrical drum (5) in two parts (41, 45) equipped with locking and position-holding shoes (6), a machining head driven in rotation by means of a gear ring (9) and a pinion (17). The cylindrical drum (5, 41, 45) is locked and held in position with respect to the nozzle (1) by means of an intermediate coupling ring (23) secured by screws (31) to the nozzle (1) and by the locking shoes (6) fixed to hydraulic rams (47).

21 Claims, 5 Drawing Figures

METHOD AND APPARATUS FOR MACHINING A GROOVE AROUND A TUBULAR MEMBER

This is a continuation of co-pending application Ser. No. 446,818 filed on Dec. 3, 1982 and now abandoned.

This invention relates to a transportable machine providing for the semi-automatic machining of cylindrical or taper-sided grooves and edge preparations round the outer periphery of the base of a nozzle or neck. The machine of the invention can be used advantageously for producing bevels or cylindrical or tapering surfaces outside the ends of large diameter tube having roughly cylindrical or taper bores.

A particularly advantageous application of the invention resides in reworking the nozzle connections of nuclear reactor vessels from the back, i.e. machining out the initial weld passes located at the base or at the fit-up or docking toe of a pipe connection fixed onto the shell section of a nuclear reactor vessel by welding. In order to weld these large diameter connections or flange units or nozzles on the periphery of a nuclear reactor vessel a continuous weld is first made between the nozzle and the reactor vessel. Before proceeding to final welding the initial weld passes have then to be removed and the outside edge preparation reconstituted. These operations must be performed on the part while it is held at a high temperature approaching 200° C. This means that these machining operations, usually carried out manually, require long tricky work under trying conditions.

In French Pat. No. 78 11 763 a machining machine has already been described which enables the semi-automatic production of cylindrical or taper-sided grooves between a nozzle and a large diameter vessel on the inside of the said vessel. In that document the machine comprises a rotary machining head which can be held in position with respect to the nozzle by means of two sets of locking shoes which come into contact with the inner wall of the said nozzle.

The purpose of the instant invention is to enable the above-mentioned machining operations to be carried out on the outer side of the vessel and also improve the locking and position-holding of the machine with respect to the nozzle.

The machine for machining grooves round the outside of the base of a nozzle or neck according to the invention comprises a cylindrical drum shaped to fit inside part of the nozzle. The cylindrical drum is provided with locking and position-holding shoes which can engage against the inner wall of the nozzle. The machine also comprises a machining head fitted with a toolholder adjustably radially, vertically and for slope. The machining head is driven in rotation by means of a gear ring comprising rolling bearing elements and engaging with a planet gear. According to the invention the cylindrical drum is locked and held in position with respect to the nozzle by a combination of two means. The first means consists of an annular plate or intermediate coupling ring which can be fixed at the outside end of the cylindrical drum. The intermediate ring also comprises means enabling it to be fixed onto the outside front face of the nozzle. The second means consists of a set of locking shoes fixed to hydraulic cylinders or rams installed in the same radial plane near to the end of the cylindrical drum located on the inner side with respect to the vessel. In this description the terms "inner" or "inside" or "internal" and the terms "outer" or "outside" or "external" are conventionally taken to refer to the vessel the nozzle is fixed on.

In these conditions it can be seen that the cylindrical drum, i.e. the whole machine, is locked and held in position close to each end of the said cylindrical drum by means firstly of the coupling ring and secondly of the locking shoe system. This thus provides excellent position-holding during the machining operations.

The means enabling the intermediate coupling ring to be fastened on the outside front face of the nozzle preferably comprise three securing pads fixed to the ring and which can be secured, by screws, for example, to three cleats fixed to the outside front face of the nozzle. These three cleats may, for example, be welded onto the said outside front face.

It will be observed that the bore of such a nozzle or neck or coupling is never perfectly circular. Furthermore, the theoretical centre line of the nozzle and the true axis of rotation of the machining head which must be centred with respect to the groove being machined, do not generally coincide. The fact that, in order to lock and hold the position of the machine's cylindrical drum, locking shoes are used which are operated by hydraulic rams therefore having variable strokes makes it possible to fit the means of locking the machine's cylindrical drum to any defects in centering, thus achieving appropriate locking of the cylindrical drum without any adjustments being required.

The intermediate ring can be fitted with three adjustable locating pads having projecting fingers which engage with the inside wall of the nozzle. It is then possible to install and fix the ring more easily by previously adjusting the three locating pads in accordance with the nozzle diameter being machined.

In order to prevent the inside of the nozzle from being scratched at all when the machine is being inserted, three guide rods are preferably fixed to the outside of the cylindrical drum over its whole height so as to engage with recesses fixed with respect to the intermediate ring bore when the cylindrical drum is being inserted into the nozzle. These recesses can, for example, be made on the three intermediate coupling ring securing pads.

In an advantageous embodiment of the machine of the invention the machining head is mounted on a plate driven in rotation through the gear ring. The rotary plate is fixed to a sleeve which partly enters the cylindrical drum and is supported with respect to this drum by a rolling bearing, e.g. a taper roller bearing, fitted near to the inside end of the said sleeve with respect to the reactor vessel.

It is preferable for a closing wall to bound a leaktight casing in a section of the cylindrical drum which can be filled with lubricant, oil for example, in which the rollers of the gear ring carrying the machining head are immersed along with the rolling bearing carrying the end of the above-mentioned rotary sleeve. In order to improve the cooling of this oil bath the lubricant is agitated by a set of radial vanes fixed to the rotray sleeve.

If and when the machining is carried out at high temperature, as stated above, a cylindrical heat shield or thermal protection envelope is preferably placed round the cylindrical drum, the above-mentioned guide rods being placed outside the protection envelope. The envelope is fixed to an end plate and the whole assembly bounds a more or less leaktight inside space which contains both the rotary sleeve and a section of the oil casing and all the hydraulic rams operating the locking shoes. A central duct is placed inside the rotary sleeve and leads outside the closing wall of the said sleeve. It is thus possible to set up a flow of cooling air supplied by the central duct into the inside space bounded by the thermal protection envelope.

The leaktight casing filled with lubricant containing the rotary sleeve is preferably bounded in the centre by the outer wall of the central duct. In this way there is an exchange of heat between the lubricant contained in the casing and the flow of cooling air inside the central duct.

All these means therefore provide adequate cooling of the machine's parts in spite of the high temperature of the part being machined.

In order to balance the machine the machining head preferably comprises two diametrically opposed toolholder arms driven in rotation round the machine's centre line. The rotational drive of the machining head is achieved, as has been explained, through a pinion mounted diametrically opposite to its driving electric motor. These two components are placed in cross formation which improves the balance of the machine.

The invention will be more clearly understood on studying the detailed description of a particular embodiment given as a non-restrictive example and illustrated by the appended drawings, in which.

Figure 1:
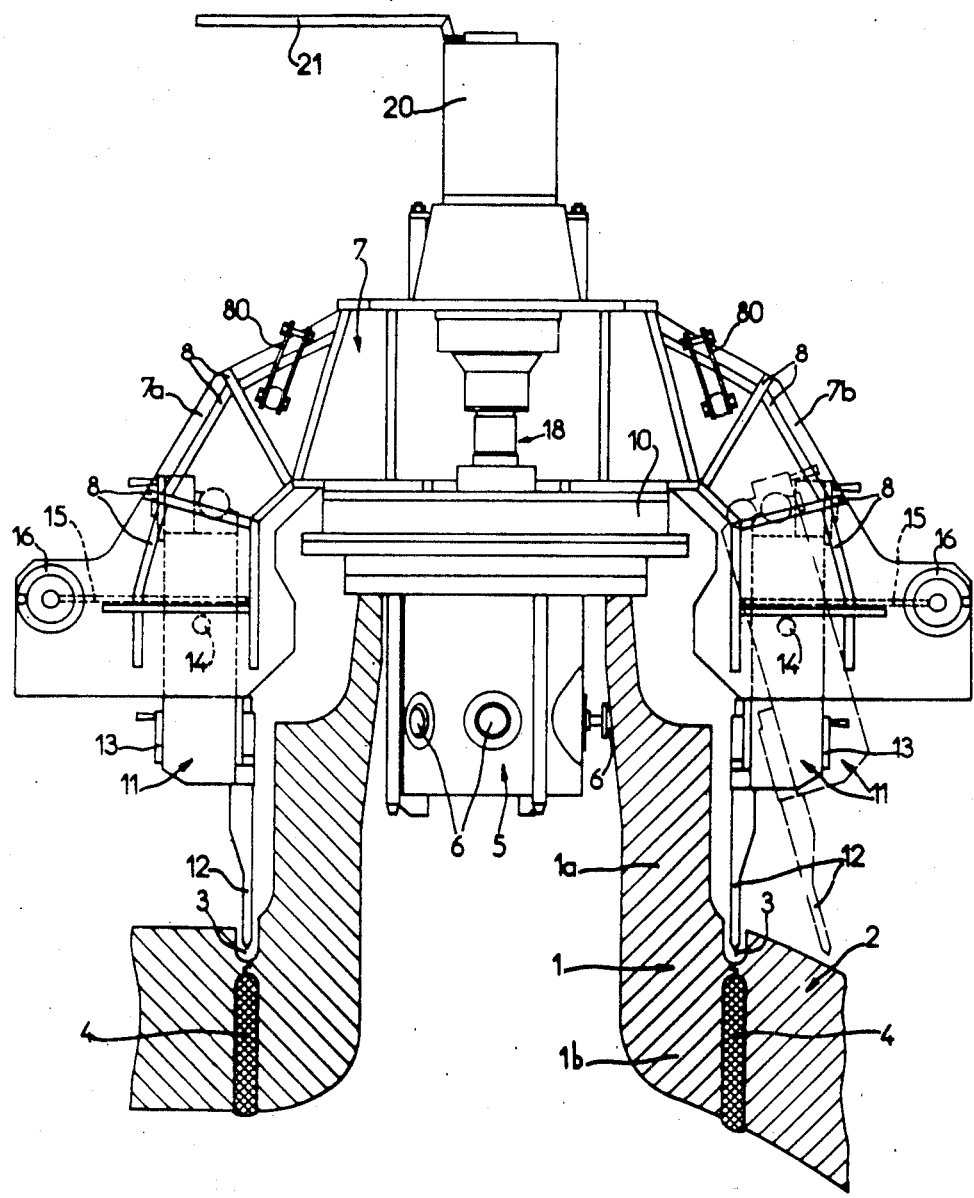
FIG. 1 is an external elevation view showing the whole machine installed for a machining operation on a nuclear reactor vessel nozzle.
Figure 2:
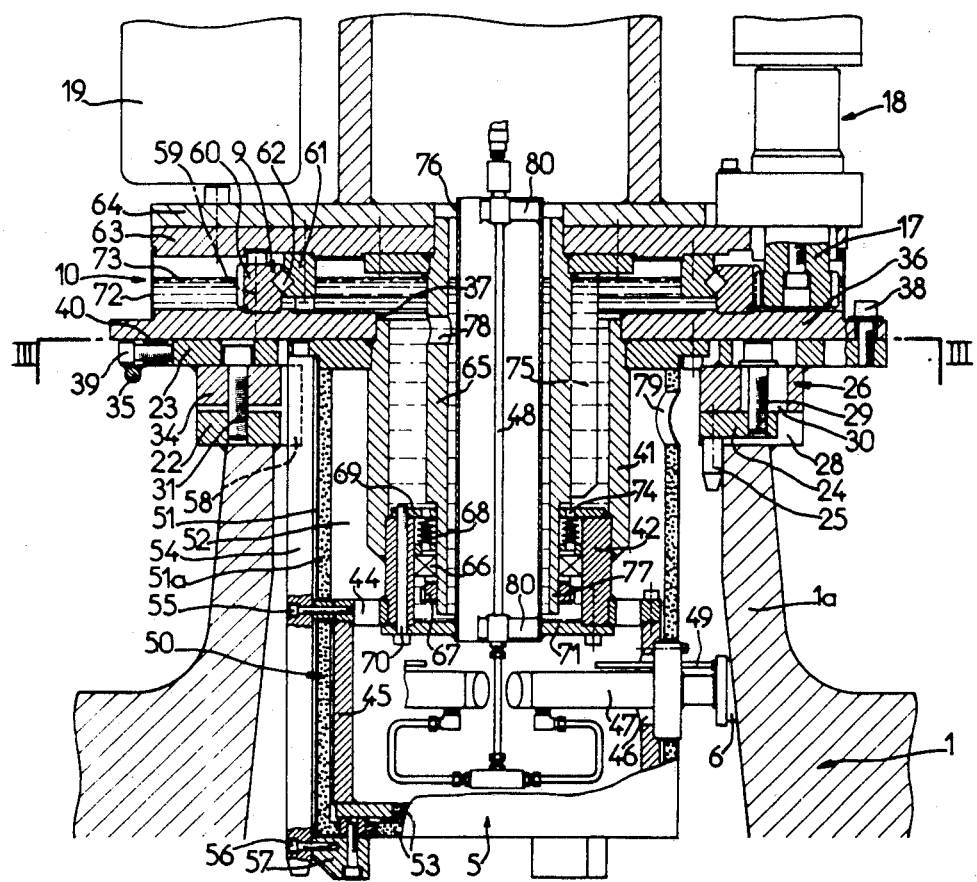
FIG. 2 is a part section view showing in particular the means of locking and holding in position the machine on the nozzle, in detail.

As shown in the figures the machine according to the invention is installed inside a nozzle 1 designed to be welded to the roughly cylindrical outer periphery of a nuclear reactor vessel 2. For the machining operation the nozzle is positioned as shown in FIGS. 1 and 2 with its centre line vertical, the vessel centre line being horizontal. The nozzle 1 comprises a neck section the inner portion of which is more or less tapered and a radial collar 1b provided round its outer edge with an edge preparation bounding an external groove 3 with a similar edge preparation made on the corresponding periphery of the edge of the vessel 2. An internal groove 4 is also bound on the inside of the vessel between two edge preparations machined respectively on the radial collar 1b and the periphery of the vessel 2. In FIG. 1 the inside groove 4 has already been filled with a continuous weld bead.

Before proceeding to weld the nozzle 1 on the vessel 2 by means of a welding bead completely filling the external grovoe 3, the bottom of the said external groove 3 has to be machined out to eliminate the welding runs located at the bottom of groove 4 and to reform the outside edge preparation by this machining operation. This operation known in French as "reprise de l'envers" or back reworking, can be performed automatically by means of the machine according to the invention.

As can be seen in FIG. 1 in particular the machine comprises a cylindrical drum labelled overall with the reference 5 whose diameter is such that it can easily enter the neck 1a of the nozzle 1. The cylindrical drum 5 is fitted with a set of six shoes 6 used to lock and hold in position the cylindrical drum and applicable against the slightly tapering inner wall of the neck 1a of the nozzle 1. A beam labelled overall by the reference number 7 comprising two symmetrical arms 7a and 7b on diametrically opposite sides, suitably stiffened by a set of ribs 8, is mounted so as to be rotatable round the pivot formed by the cylindrical drum 5 by a gear ring 9 shown in FIG. 2 placed inside a casing 10 seen in FIG. 1. Both the diametrically opposite symmetrical arms 7a and 7b of the beam 7 comprise a machining head, labelled overall by reference number 11, on that end which points down outside the nozzle 1. Each machining head 11 comprises a toolholder slide 12 the vertical position of which can be adjusted by means not shown in the figures and which comprise, in particular, a control servo-motor and a manual setting wheel 13.

The inclination to the vertical of the toolholder 12 and of the whole of the machining head 11 is produced by swivelling round the horizontal pivot pin 14. Furthermore the whole of the machining head 11 can be moved radially by means of the horizontal screws 15 driven in rotation by the wheel 16.

In this way it is possible to get adjustment of the toolholder 12 at once radially, vertically and in inclination so as to enable all the required machining operations to be carried out and in particular the machining of groove 3 and turning the sides of this groove.

The beam 7 carrying the machining heads 11 is driven in rotation by a drive pinion 17 shown in FIG. 2 driven by a reduction gear 18 which is itself driven through a belt transmission not shown in the figures by an electric drive motor 19 shown in FIG. 2. The power supply to the electric motor 19 and the various servo-motors controlling the position of the toolholders 12 comes through a collector 20 on the frame of which is fixed an anti-torque arm 21 which also takes the electrical connecting cables.

It will be noted that the diametrically opposite symmetrical arrangement of the two machining heads 11 and of the arms 7a and 7b of the beam 7 enables an excellent balance of the whole of the machine to be achieved during operation. The same is true of the diametrically opposite configuration round an axis perpendicular to the general axis of the beam 7 of reduction gear 18 and of the drive motor 19 making the unit rotate.

Figure 5:
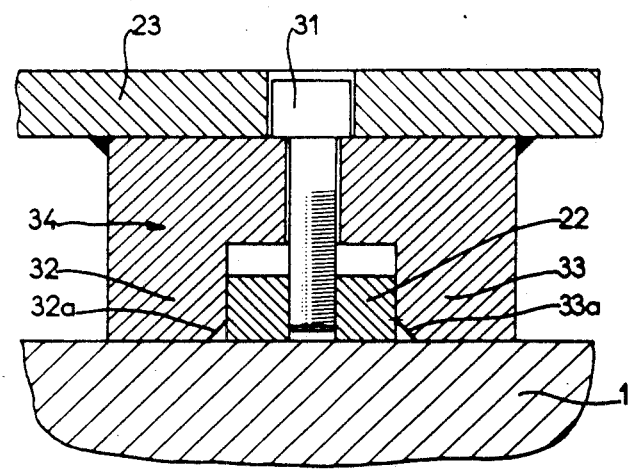
FIG. 5 is a section view along V—V in FIG. 3 showing the detail of a securing pad.

Reference will now be made to FIGS. 2 and 5 to give a more detailed description of the means enabling the cylindrical drum 5 to be locked and held in position inside the neck 1a of the nozzle 1.

In order to fix the machine the outside front face of the nozzle 1 comprises three cleats 22 welded onto the said outside front face, one only of which can be seen in FIG. 2.

Figure 4:
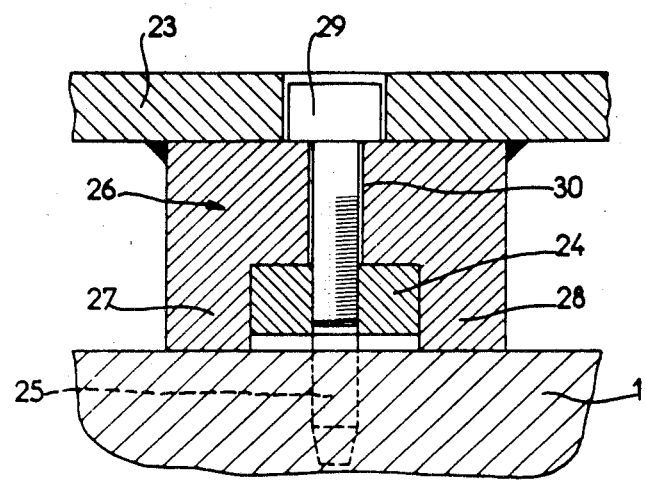
FIG. 4 is a section view along IV—IV in FIG. 3 showing the detail of a locating pad.

An intermediate coupling ring 23 comprises three adjustable locating pads 24 each provided with a projecting finger 25 which can come into contact with the roughly cylindrical inside wall of the neck 1a of the nozzle 1. When it is being moved radially for preliminary adjustment each locating pad 24 is guided by its side faces inside a channel made in a guide piece 26 shown, in particular, in FIG. 4, fixed to the bottom face of the intermediate ring 23. Each guide piece 26 comprises two side arms 27 and 28 which bound the guide channel of the adjustable pad 24 as can be seen in FIG. 4 and which come and bear against the outside front face of the nozzle 1. After the three fingers 25 of the locating pads 24 have been set to their radial position, which adjustment can be facilitated by the existence of suitably positioned graduations and markings, the locating pads 24 are locked by screws 29 fixed to the said locating pads 24 and movable inside oblong slots 30 made in the guide pieces 26. Radial movement of the various locating fingers 25 therefore enables the assembly to be fitted to the particular diameter of the nozzle being machined, thus easing installation of the intermediate coupling ring 23 on the outside front face of the nozzle 1.

The intermediate ring 23 is fixed onto the nozzle 1 by means of three screws 31 engaging with tapped holes made in the cleats 22. During installation the cleats 22 slip between two side arms 32 and 33 of the securing pads 34 fixed, by welding for example, to the ring 23, as can be seen in FIG. 5 in particular. The screws 31 passing through holes made in the securing pads 34 fix the ring 23 to the nozzle 1 through the three cleats 22. It will be noted that the handling rings 35 enable the ring 23 to be placed into position.

A fixed plate 36 having a central hole 37 is secured by screws 38 to the top face of the intermediate coupling ring 23. In order to ease installation, four adjustment screws 39 engage with a part acting as a nut 40 fixed to the plate 36 and bear against part of the periphery of ring 23. By operating the screws 39 it is therefore possible to adjust the position of the machining head 11 in relation to the existing groove.

A cylindrical part 41 is fixed by welding in the hole 37 in the fixed plate 36 and forms the first outer section of the cylindrical drum 5 acting as the pivot for rotation of the machining head. The cylindrical part 41 comprises, on its inner portion with respect to the vessel, a bearing support piece 42 provided with through passages 44.

At the periphery of the annular plate 43, on the side opposite the outer section 41 of the cylindrical drum 5, a second cylindrical part 45 is fixed which forms the second inner section of the drum 5 and has a larger diameter than the first section 41.

As can be seen in FIG. 2 the assembly thus made up of the two cylindrical parts 41 and 45 having slightly different diameters makes it possible to obtain a drum 5 that is roughly cylindrical and can enter inside one portion of the end of the nozzle 1 so as to lock and hold the machine in position.

For this purpose the second cylindrical inner section 45 of the above-mentioned cylindrical drum 5 comprises, in a single diametral plane of the drum 5, six peripheral openings 46 within which six hydraulic cylinders or rams 47 are installed which are fed with hydraulic fluid by a line 48 located on the centre line of the cylindrical drum 5. The rods of the hdyraulic rams 47 have, on the ends thereof which project outside the cylindrical drum 5 and the cylindrical section 45, locking shoes 6 the surface of which can advantageously be fitted with a suitably inclined part so as to come into contact with the tapered inside surface in the example illustrated of the nozzle 1. The ram rods 47 are guided during this outward movement by a rod 49 so that the angular position of the inclined contact face of the shoes 6 is maintained.

A cylindrical heat shield envelope 50 completely surrounds the cylindrical drum 5. The envelope 50 comprises a layer 51a of a thermally insulating material placed on the inside and a thin sheet 51 of stainless steel placed on the outside and suitably polished, providing mechanical support to the heat shield assembly. The diameter of the cylindrical envelope 50 is constant throughout its height and it practically comes into contact with the external cylindrical surface of the inner section 45, whilst a relatively large annular space marked 52 in FIG. 2 remains between the said envelope 50 and the outer section 41 of the cylindrical drum 5, owing to its smaller diameter.

The heat shield envelope 50 comprises perforations letting through the locking shoes 6 actuated by the rams 47.

The thermal insulation is completed on the side of the cylindrical drum bottom by a double insulating plate 53.

Figure 3:
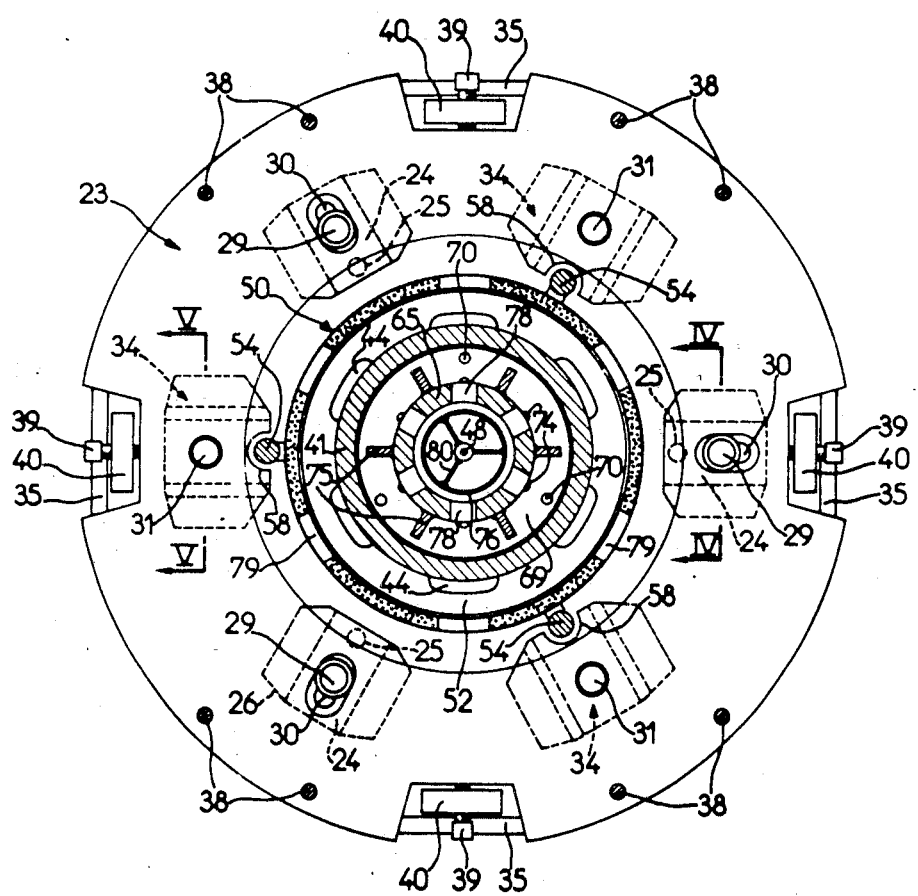
FIG. 3 is a section view through III—III of FIG. 2 showing in particular the construction of the intermediate coupling ring.

Three cylindrical guide rods 54 are fixed on the outside of the protective envelope 50 spaced 120° apart and extending through the height of the envelope 50. They are secured in particular by means of screws 55 which engage with the annular plate 43 and screws 56 which engage with a fixing piece 57 in the bottom inside section of the cylindrical drum 5. The three guide rods 54 engage with semicircular recesses 58 shown in FIG. 3 made on a part of the securing pads 34 which protrudes into the bore of the nozzle 1. Thus, when the cylindrical drum 5 and the protective envelope 50 surrounding it are inserted the assembly is correctly guided by the rods 54 and is kept a suitable distance away preventing the inside surface of the nozzle 1 from being scratched.

On the fixed plate 36 and fixed to it by screws 59, represented schematically by their centre lines, is the outer ring with external teeth of the gear ring 9. The inner ring 61 can therefore rotate with respect to the fixed inner ring 60 on rollers 62. The inner ring 61 is fixed by screws, represented schematically by their centre line, to a rotary plate 63 having a central hole and carrying the reduction gear 18 of the drive pinion by means of an assembly plate 64.

A rotary sleeve having the overall shape of a cylinder 65 is mounted in the central hole in the rotary plate 63 and fixed by welding to this plate so as to extend inwards into the nozzle 1 inside the first section 41 of the cylindrical drum 5. Near the inside end of the rotary sleeve 65 a rolling bearing 66 is installed which advantageously comprises taper rollers. The bearing 66, mounted between the end of the sleeve 65 and the bearing support piece 42, is held in position against a lock nut 67 by "prestressing" action applied by a plurality of spiral springs 68 which come into contact with a horizontal support plate 69 fastened by screws 70 to the top face of the bearing support piece 42.

A closing wall 71 is also fixed to the bottom face of the bearing support piece 42 beneath the middle of the annular plate 43. A cylindrical metal sheet 72 fixed on a shoulder of the fixed plate 36 encloses the space between the said fixed plate 36 and the rotary plate 63 thus bounding the casing 10 which takes the gear ring 9 and the pinion 17.

This casing is filled with oil, the level 73 of which can be seen in FIG. 2, and this oil also fills the space bounded by the first section 41 of the cylindrical drum 5, the bearing support piece 42 and the closing end wall 71 which forms the bottom of this space. In order to enable the oil to flow through into the bottom and into the area taking the rolling bearing 66 in particular, it will be observed that the support plate 69 has perforations 74 in it.

In order to set up an agitational movement cooling the oil contained in this casing the rotary sleeve 65 comprises six radial vanes 75 which extend into the space situated between the said rotary sleeve 65 and the first section 41 of the cylindrical drum 5, throughout the height of this space, and which are therefore immersed in the oil contained in the above-mentioned casing.

A central duct 76 having an overall cylindrical shape and the same centre line as all the cylndrical parts already mentioned is placed inside the rotary sleeve 65. This duct is fixed to the closing end plate 71 which is a fixed component. It is placed a certain distance from the inside wall of the rotary sleeve 65 whose bottom frontal face 77 is placed some way from the closing end wall 71. The oil situated in the casing of the gear ring 9 and of the top section of the cylindrical drum 5 can therefore also flow into the rotary sleeve 65 in the annular space remaining between this latter and the central duct 76. In order to ease the flow of oil into this annular space radial holes 78 are made in the wall of the rotary sleeve 65 between the various agitation vanes 75 approximately at the level of the fixed plate 36.

A flow of cooling air generated by a blower not shown in the figure can be set up so as to enter the inside of the central duct 76 and flow vertically from top to bottom through the said duct 76 into the space bounded by the inner section 45 of the cylindrical drum 5 and the bottom wall 53. This cooling air can also subsequently rise through the perforations 44 in the annular plate 43 into the space 52 inside the heat shield envelope 50 and escape through discharge ports 79 made in the heat shield envelope close to the top thereof, i.e. at approximately the level of the outside front face of the nozzle 1.

It will be observed that the flow of cooling air in contact with the thin wall of the central duct 76 facilitates heat transfer through this duct's wall to the oil lying inside the rotary sleeve 65 and coming into contact with the outside wall of the central duct 76. This means that there is enhanced cooling of the whole machine.

FIG. 2 also indicates the system fixing the hydraulic ram 47 control oil feed line 48 which consists of two sets of three radial supports 80 near the top and bottom ends of the central duct 76.

The machine according to the invention is used in the following manner:

After the two cleats 22 have been welded on the outer front face of the nozzle 1, the radial position of the three locating pads 24 is adjusted in accordance with the specific diameter of the nozzle needing machining. When this operation has been carried out and the locating pads 24 have been locked by screws 29, the intermediate coupling ring is handled into position supported by slings temporarily secured to the handling rods 35. Installation of the intermediate coupling ring 23 is facilitated by its being centred by means of the three fingers 25 on the locating pads 24 in the bore of the nozzle 1. The ring 23 is positioned angularly by inserting the cleats into the guide channels located between the side arms 32 and 33 of the securing pads 34 fixed to the ring 23. Assembly is made easier by the bevels 33a and 32a shown in FIG. 5.

After this the ring 23 secured by means of screws 31.

The rest of the machine, comprising in particular the machining heads 11 and their drive means 18, 19, is lifted by slings engaging with the hooks 80 shown in FIG. 1 until it is located above the nozzle 1, the centre line of which is kept roughly vertical. The whole machine is lowered. gradually so the three guide rods 54 slip into the semicircular recesses 58 in the three securing pads 34, thus guarding against any risk of scratching the inside surface of the nozzle 1.

When the cylindrical drum has been inserted as far as possible into the nozzle 1, the position of the fixed plate 36 is adjusted by means of the four adjustment screws 39 until the tools are concentric with the existing groove.

The machine is then ready for operation; the toolholder 12 is set for position and orientation as has already been explained.

Although the machine has been shown here in a specific case of machining appropriate to fixing a nozzle onto a nuclear reactor vessel by welding, it will be understood that this machine can also be used for edge preparations having cylindrical or taper profiles around the outside of the ends of large diameter tubes whatever may be the internal profile of the bore of such tubes.

We claim:

1. An apparatus for machining an annular groove around an external portion of a radially extending base of tubular member, said tubular member having said base at one end and having a transverse end surface at its other end, comprising:
   (a) a drum adapted to be inserted within said tubular member, a set of locking shoes mounted on said drum, and hydraulic ram means for extending the locking shoes in a substantially radial plane into contact with the inner surface of said tubular membear to lock and position said drum within the tubular member;
   (b) an annular plate means connected to said drum, said annular plate means extending radially outwardly from said drum for engaging said transverse end surface of said tubular member, means for securing said annular plate means to said transverse end surface of said tubular member, said securing means including cooperating members mounted respectively on the annular plate and on the transvere end surface of the tubular member, fasteners for connecting said cooperating members together, and means which are radially adjustable with respect to said tubular member and are operable to retain the annular plate means at a precise radial position with respect to said tubular member, said annular plate means being operable to hold the drum at a precise axial position within the tubular member;
   (c) a machining head section supported for rotary motion relative to said drum, said machining head section being fitted with an adjustable tool-holder element;
   (d) a driving means for rotating said machining head section, said driving means including a ring gear, rolling bearing elements on said ring gear, and a planet wheel engaged with said ring gear.

2. The apparatus according to claim 1, characterized in that the means for securing the annular plate to the transverse end surface of the tubular member comprises three securing pads provided with fasteners for engaging corresponding cleats fixed to the transverse end surface of the tubular member.

3. The apparatus according to claim 2, wherein each of said securing pads has side arms forming a guide channel for receiving a cleat on the tubular member.

4. The apparatus according to claim 1 wherein the radial adjustability of the securing means is provided by three adjustable locating pads mounted on said annular plate, each of said locating pads having a projecting finger which is engageable with the inside wall of the tubular member when the annular plate is being installed on the end of the tubular member.

5. The apparatus according to claim 1 wherein three guide rods are fixed on the outside of the drum throughout its length, recesses being provided for receiving the guide rods.

6. The apparatus according to claim 5 having three securing pads mounted on said annular plate, said recesses being formed in said securing pads.

7. The apparatus according to claim 1 having a rotary sleeve which has an inner portion extending into the drum, said ring gear being affixed to the rotary sleeve, and a rolling bearing supporting the inner portion of the sleeve.

8. The apparatus according to claim 7 having a leaktight casing in the drum, said casing being operable as a lubricant reservoir, and a set of radial vanes fixed to the rotary sleeve for agitating lubricant in the casing.

9. The apparatus according to claim 1 having a thermal protection envelope surrounding the drum, guide rods located outside said envelope, said apparatus having a substantially leaktight lubricant reservoir located in said thermal protection envelope.

10. The apparatus according to claim 9, having a ventilation duct extending through and forming an inner wall of the lubricant reservoir, thus enhancing heat exchange.

11. The apparatus according to claim 9 having a sleeve which is rotatable relative to said annular plate, said ventilation duct being located inside the sleeve, said duct being connected to the interior of the thermal protection envelope.

12. The apparatus according to claim 11 wherein the rotary sleeve is provided with holes which allow lubricant to flow therethrough.

13. The apparatus according to claim 1 wherein the cylindrical drum comprises an outside section and an inside section, said inside section having a larger diameter than said outside section, said outside section having a closing end wall, an annular connecting plate connecting the outside section to the inside section, said connecting plate having holes formed therein to permit cooling air to flow therethrough.

14. The apparatus according to claim 1 having rod means for guiding the radial movement of the locking shoes and for preventing rotation of the locking shoes about their respective axes.

15. The apparatus according to claim 1 wherein the machining head has a rotary frame provided with two diametrically opposed tool-holder arms.

16. An apparatus for machining an annular groove around an external portion of a radially extending base of a tubular member, said tubular member having said base at one end and having, at its other end, a transverse end surface provided with fastening cleats secured thereto, comprising:

(a) a cylindrical member adapted to be inserted within said tubular member, a set of locking shoes mounted in said cylindrical member, and hydraulic ram means for extending the locking shoes in a substantially radial plane into contact with the inner surface of said tubular member to lock and position said cylindrical member within the tubular member;

(b) an annular plate connected to and extending substantially radially outwardly from said cylindrical member, said annular plate having securing pads which cooperate with said fastening cleats, each of said securing pads comprising side arms forming a guide channel for receiving and cooperating with one of said fastening cleats, said side arms being adapted to contact said transverse end surface, screws for securing said annular plate to said fastening cleats, and radially movable means which are adjustable relative to said tubular member to locate the annular plate means at a precise radial position with respect to said tubular member;

(c) a machining head section supported for rotary motion relative to said drum, said machining head section being fitted with an adjustable tool-holder element;

(d) and driving means for rotating said machining head section, said driving means including a ring gear, rolling bearing elements on said ring gear, and a plant wheel engaged with said ring gear.

17. An apparatus according to claim 16 comprising lateral guiding rods fixed on the outside of the cylindrical member throughout its length and passing through recesses provided in an inner section of said fastening cleats and said securing pads, said inner section protruding into said tubular member.

18. An apparatus for machining an annular groove around an external portion of a radially extending base of a tubular member, said tubular member having said base at one end and having, at its other end, a transverse end surface provided with fastening cleats secured thereto, comprising:

(a) a cylndrical member adapted to be inserted within said tubular member, a set of locking shoes mounted in said cylindrical member, and hydraulic ram means for extending the locking shoes in a substantially radial plane into contact with the inner surface of said tubular member to lock and position said cylindrical member within the tubular member;

(b) an annular plate connected to said cylindrical member adapted to lie on said transverse surface of said tubular member and having adjustable centering pads each of which has a projecting finger engageable with the inside surface of the tubular member, said annular plate being provided with guiding elements comprising side arms forming a guide channel for receiving one of said centering pads, said side arms being adapted to contact said transverse end surface, said guiding elements being fixedly secured to said annular plate and having slots through which may pass screws for securing said guiding elements to said centering pads whereby the position of said fingers may be adapted to the diameter of the tubular member;

(c) a machining head section supported for rotary motion relative to said drum, said machining head section being fitted with an adjustable tool-holder element;

(d) and driving means for rotating said machining head section, said driving means including a ring gear, rolling bearing elements on said ring gear, and a planet wheel engaged with said ring gear.

19. An apparatus for machining an annular groove around an external portion of a radially extending base of a tubular member, said tubular member having said base at one end and having, at its other end, a transverse end surface provided with fastening cleats secured thereto, comprising:

(a) a cylindrical member adapted to be inserted within said tubular member, a set of locking shoes mounted in said cylindrical member, and hydraulic ram means for extending the locking shoes in a substantially radial plane into contact with the inner surface of said tubular member to lock and position said cylindrical member within the tubular member;

(b) an annular plate connected to said cylindrical member and extending radially outwardly therefrom to lie on said transverse end surface of said tubular member, means for securing said annular plate to said transverse end surface of said tubular member, said securing means including cooperating members mounted respectively on the annular plate and on the transverse end surface of the tubular member, said fastening cleats comprising said cooperating members on the tubular member, fasteners for connecting the cooperating members together, and means which are radially adjustable with respect to said tubular member and are operable to retain the annular plate at a precise radial position with respect to said tubular member;

(c) a fixed plate secured to said cylindrical member and adjustably secured to said annular plate;

(d) a machining head section supported for rotary motion relative to said fixed plate, said machining head section being fitted with an adjustable toolholder element;

(e) and driving means for rotating said machining head section, said driving means including a ring gear fixedly secured to said fixed plate, rolling bearing elements on said ring gear and a planet wheel engaged with said ring gear and connected to said machining head section.

20. A method of locking and holding in position a machine for machining an annular groove around an external portion of a base which extends radially from one end of a tubular member; said tubular member having another end which has securing cleats attached thereto; said machine having a drum mounted on an intermediate coupling ring, said intermediate coupling ring including an annular plate provided with members which are cooperatively engageable with said securing cleats on the tubular member, and a machine head which carries tools and is rotatable relative to said drum, said method comprising the steps of;

radially adjusting the intermediate coupling ring relative to the tubular member to locate the intermediate coupling ring at a precise radial position with respect to said tubular member, fixing the intermediate coupling ring to the transverse end surface of the tubular member, said fixing step being performed by using fasteners to connect said members on the annular plate to the securing cleats on the transverse end surface of the tubular member, inserting the drum of the machine inside a portion of the tubular member, locking the drum in position by (a) affixing the drum to the intermediate coupling ring and (b) radially extending a set of locking shoes from the drum into contact with the tubular member, said locking shoes being located near the inner end of the drum.

21. The method of claim 20 wherein the drum and the coupling ring have cooperating guide surfaces for guiding the movement of the drum into the tubular member, said guide surface on the coupling ring lying radially inwardly with respect to the inside surface of the tubular member, said inserting step being performed while guiding the guide surface of the drum with the guide surface of the coupling ring to prevent damage to the inside surface of the tubular member.

* * * * *